United States Patent [19]

McAllise

[11] 4,422,030
[45] Dec. 20, 1983

[54] A.C. MOTOR CONTROL

[76] Inventor: Raymond J. McAllise, 1812 Bruce St., Canal Fulton, Ohio 44614

[21] Appl. No.: 301,423

[22] Filed: Sep. 11, 1981

Related U.S. Application Data

[63] Continuation-in-part of Ser. No. 178,499, Aug. 15, 1980, abandoned.

[51] Int. Cl.³ ............................................. H02P 1/18
[52] U.S. Cl. .................................. 318/779; 318/778; 318/800; 318/809; 318/812
[58] Field of Search ............... 318/770, 778, 779, 780, 318/798, 800, 809, 810, 812, 813

[56] References Cited

U.S. PATENT DOCUMENTS

| | | | |
|---|---|---|---|
| 3,461,370 | 8/1969 | Canter | 318/812 X |
| 3,732,484 | 5/1973 | McKenna | |
| 3,787,724 | 1/1974 | Pedersen et al. | 318/778 X |
| 4,052,648 | 10/1977 | Nola | 318/810 |
| 4,072,880 | 2/1978 | Oshima et al. | 318/778 X |
| 4,093,899 | 6/1978 | Denny | 318/812 X |
| 4,110,671 | 8/1978 | Roger | 318/810 X |
| 4,152,758 | 5/1979 | Bailey et al. | 318/778 X |
| 4,157,491 | 6/1979 | Werner et al. | 318/798 |
| 4,160,192 | 7/1979 | McAllise | |
| 4,242,626 | 12/1980 | Gross | 318/810 X |
| 4,243,926 | 1/1981 | Phillips | 318/798 |
| 4,287,464 | 9/1981 | Lee et al. | 318/798 X |
| 4,323,835 | 4/1982 | Lee | 318/809 X |

FOREIGN PATENT DOCUMENTS

| | | | |
|---|---|---|---|
| 2112154 | 2/1973 | Fed. Rep. of Germany | 318/778 |
| 7808764 | 2/1979 | Netherlands | 318/778 |
| 1568507 | 5/1980 | United Kingdom | 318/778 |
| 609183 | 5/1978 | U.S.S.R. | 318/778 |

Primary Examiner—J. V. Truhe
Assistant Examiner—Richard M. Moose
Attorney, Agent, or Firm—McCormick, Paulding & Huber

[57] ABSTRACT

A control for an A.C. motor operates to feed a high average value of voltage to the motor during a starting period of predetermined duration and to then automatically switch the voltage supplied the motor to a lower average voltage of substantially fixed value. This lower value of average voltage is determined without feedback to the control circuit. The control may be designed for use with single phase or multiple phase motors and for motors of various different power ratings.

43 Claims, 12 Drawing Figures

A.C. MOTOR CONTROL

CROSS-REFERENCE TO RELATED APPLICATION

This application is a continuation-in-part of application Ser. No. 178,499, filed Aug. 15, 1980, now abandoned.

BACKGROUND OF THE INVENTION

This invention relates to controls for A.C. motors used with standard substantially constant frequency and substantially constant voltage A.C. power sources, and deals more particularly with such control whereby a high average value of voltage is supplied to the motor during starting and whereby, as an energy saving feature, the average value of the voltage supplied the motor is reduced following starting and during the motor's normal running phase.

The control system of this invention may be used with various different types of A.C. motors adapted for use with standard substantially constant frequency and substantially constant voltage A.C. power sources, but is particularly well-adapted for use with induction motors. In such motors, the maximum power requirement usually occurs during starting, and they are therefore, of course, designed to produce the torque necessary for assured starting even though the number of winding turns and other factors required to achieve proper starting are not fully required for running. As a result, unnecessarily high currents flow through the motor windings during running and produce $I^2R$ heat which not only represents the loss of energy but also may cause heat damage to the motor or its surroundings.

Prior U.S. Pat. No. 4,052,648 shows a motor control system wherein a generally higher average voltage is supplied to the motor during a starting period than during the following running phase. In the control of this patent, however, the power factor of the power supplied to the motor is determined through a relatively complicated circuit and the voltage supplied the motor is controlled to maintain the detected power factor at a commanded value. The general object of this invention is to achieve the asserted power saving benefits of the patented controller with a control which is much less complicated and costly and more reliable, versatile and easy to install.

Other objects and advantages of the invention will be apparent from the following detailed description of the preferred embodiments thereof.

SUMMARY OF THE INVENTION

This invention resides in a control for an A.C. motor connected to a standard source of substantially constant frequency and substantially constant voltage A.C. power through a switching means. The control is responsive to the switching means and acts upon "closing" of it to first feed voltage from the source to the motor at a high average voltage value and thereafter, after the running of a given starting period, to automatically feed power from the source to the motor at a lower average value of voltage, which latter value of voltage is substantially fixed.

In one specific alternative the invention further resides in a motor voltage control means switchable between two different states at which it supplies different values of average voltage to the motor and an associated time delay device responsive to the "closing" of the switching means and operable to hold the voltage control device in one state following such closing and to thereafter switch the voltage control device to its other state at the end of the time delay period.

In another specific alternative the invention also resides in the energization of the motor being controlled by a triac or similar bilateral switch means in series with the motor, by the voltage supplied to the motor during the running phase being determined by a running trigger circuit which triggers the bilateral switch means at a substantially fixed time in each half cycle of the A.C. source, and by a starting trigger circuit which includes a time delay defining circuit and which during the running of the time delay period supplies triggering signals to the bilateral switch which occur earlier in each half cycle of the A.C. source than the running trigger signals.

The invention also resides still more specifically in various circuits used to achieve the desired control objectives.

DETAILED DESCRIPTION OF THE PREFERRED EMBODIMENTS

Figure 1:
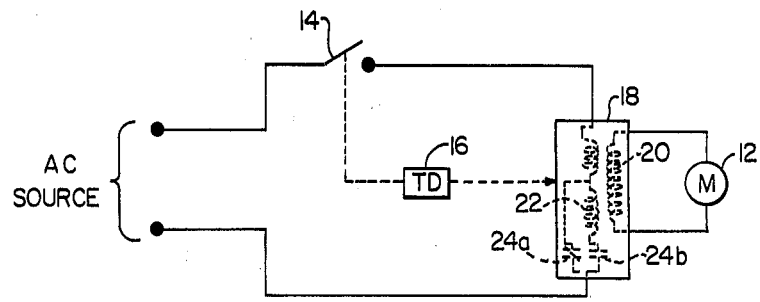
FIG. 1 is a schematic diagram illustrating a motor control circuit broadly embodying the invention.

Turning to the drawings and first considering FIG. 1, this figure shows a single phase motor 12, such as an induction motor, connected to a standard substantially constant frequency and substantially constant voltage A.C. source, such as for example a standard 110 volt and 60 Hz source, through a main switching means in the form of a main switch 14 and having associated with it a control means broadly embodying the present invention. This control means includes a time delay device 16 responsive to the closing of the switch 14, and a voltage control device 18 associated with the time delay device. The time delay device 16 provides a delay period following the closing of the switch. It may be mechanically connected to the switch 14 so as to be mechanically triggered by the closing of the switch, or it may be electrically connected with the motor 12 so as to be electrically triggered upon the switch closing.

The combination of the time delay device 16 and the voltage control device 18 has two different states at one of which it supplies voltage of high average value to the motor 12 and at the other of which it supplies voltage at a substantially fixed lower average value to the motor. The time delay device 16 controls the state of the combination and causes it to supply the high average voltage immediately following the closing of the switch 14 and to supply the lower fixed average voltage upon the running of the time delay period.

As an example of one implementation of the voltage control device 18 of FIG. 1, and as shown by the broken lines in that figure, the device may comprise a transformer having a secondary winding 20 with a fixed number of turns connected to the motor and a primary winding 22 connected to the A.C. source through a variable number of turns controlled by a switch 24a, 24b. During the starting period the time delay device 16 opens the switch 24b and closes switch 24a to provide a low number of primary turns and a corresponding high average value of voltage to the motor 12. After the lapse of the time delay period, the time delay device 16 closes the switch 24b and opens switch 24a to provide a higher number of primary turns and a corresponding lower average voltage to the motor 12.

Figure 2:
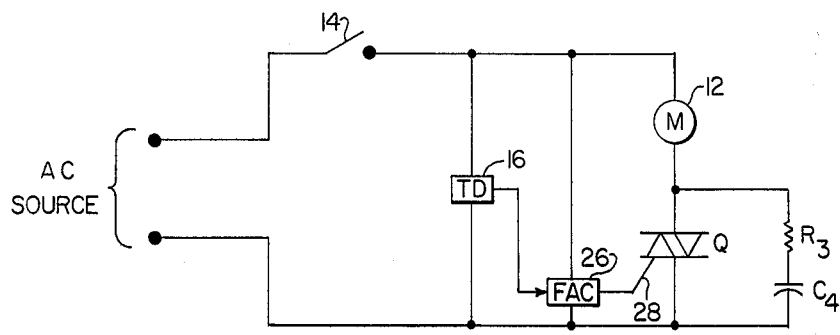
FIGS. 2 to 6 are schematic diagrams illustrating controls comprising other embodiments of the invention.

In FIG. 2 the invention is shown in a circuit wherein the motor voltage control 18 of FIG. 1 is provided by a triggered bilateral switch means, such as the illustrated triac Q, haivng its main terminals connected in series with the motor 12, and an associated firing angle control circuit 26 which, in cooperation with the time delay device 16, is operable to supply trigger signals to the trigger terminal 28 of the triac which during the starting period trigger the triac early in each half cycle of the A.C. source and which during the following running period trigger the triac at a later substantially fixed time in each half cycle of the A.C. source. Therefore, during the starting period the motor 12 is energized for a longer time during each half cycle, and therefore receives a higher average voltage, and following the starting period is energized for a shorter time during each half cycle so as to be fed a lower average value of voltage.

In the circuit of FIG. 2 and in the circuits of other following figures, an RC circuit consisting of a resistor $R_3$ and a capacitor $C_4$ are connected in series with one another across the main terminals of the triac Q. This RC circuit serves to limit the rise of the commutating voltage dv/dt which is produced by the inductive load of the motor and thereby prevents the triac from misfiring due to the commutating dv/dt stress. This RC circuit is not always required and may be omitted in some cases, as when the inductance of the motor is relatively small.

In the circuit of FIG. 2 the time delay device 16 and the firing angle control circuit 26 are both connected in parallel with one another across the series circuit consisting of the motor 12 and triac Q. This, however, is not the only possible arrangement. Instead, the triac Q may be located on either side of the motor and the firing angle control circuit 26 and/or the time delay 16 may each be connected across the triac Q so as to either include or exclude the motor 12.

Figure 3:
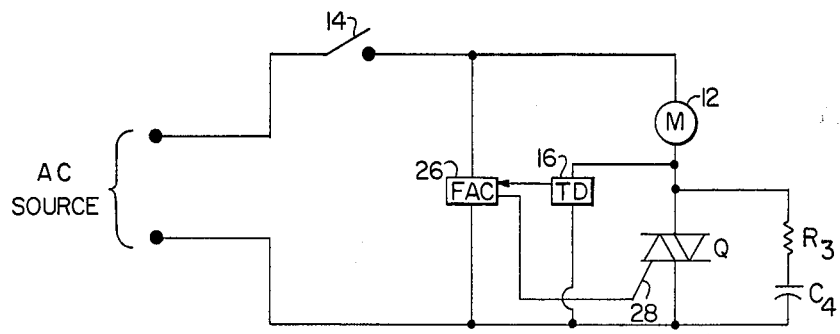

For example, FIG. 3 shows a control embodying this invention wherein the time delay device 16 is connected across the triac Q to the exclusion of the motor 12 and the firing angle control circuit 26 is connected across the triac so as to include the motor 12.

Figure 4:
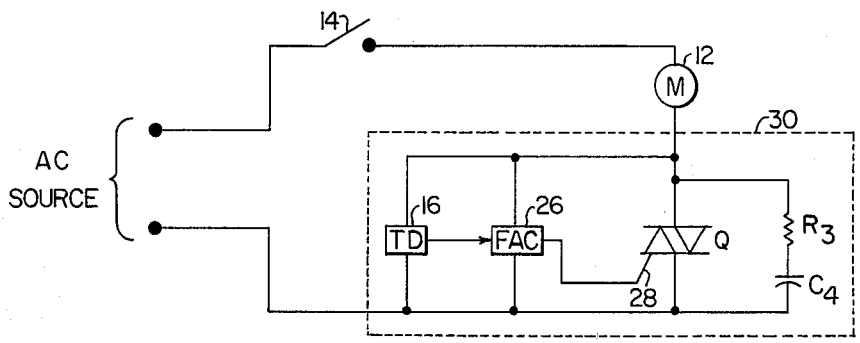

In the circuit of FIG. 4 the time delay device 16 and the firing angle control circuit 26 are both connected directly across the triac Q to the exclusion of the motor 12. This arrangement has the advantage that the entire control means may be packaged as a single unit 30 adapted to be connected in series with the motor 12 (that is, its field winding means) and switch 14, thereby allowing its packaging and installation to be simplified.

Figure 5:
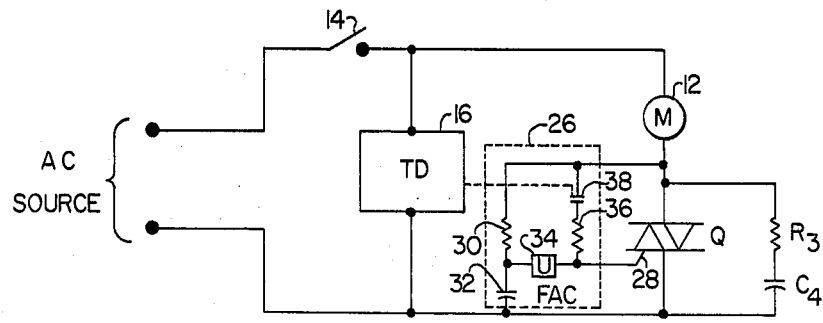

FIG. 5 shows a circuit including a control embodying this invention wherein the time delay device 16 is connected across the series combination of the motor 12 and the triac Q and the firing angle control circuit 26 is connected directly across the triac Q to the exclusion of the motor. Further, this figure illustrates a specific construction for the firing angle control circuit 26. This illustrated circuit includes a running trigger circuit consisting of a resistor 30 and capacitor 32 connected in series with one another across the main terminals of the triac Q and a voltage threshold device 34, such as a diac or neon bulb, connected to the node between the resistor 30 and capacitor 32 and to the trigger terminal 28 of the triac Q. This running trigger circuit is an open loop one, which for a given voltage and frequency of the A.C. source, supplies trigger signals to the triac Q occurring at a substantially fixed time in each half cycle of the A.C. power source. That is, in the initial portion of each half cycle the capacitor 32 charges through the resistor 30 until the breakover voltage of the voltage threshold device 34 is reached, and when this occurs current flows through the gate 28 to trigger the triac.

A starting trigger circuit is also connected with the trigger terminal 28 and consists of a current limiting resistor 36 and a set of contacts 38. The contacts 38 are in turn controlled by the time delay device 16 so as to be closed during the time delay or starting period and so as to be opened, and to remain open, at the end of the time delay or starting period. That is, the time delay device 16 operates in response to the main switch 14 to immediately close the contacts 38 upon the closing of the switch 14 and to then open the contacts 38 at a predetermined time thereafter, thereby establishing the starting period. In the starting period, during each half cycle of the A.C. source current flows through the closed contacts 38 and the resistor 36 to turn the triac Q on at an early time in each half cycle. This triggering of the triac during the starting period is earlier than its triggering during the running phase so that a higher average voltage is supplied to the motor during starting than during the running phase. As shown in FIG. 5 the starting trigger circuit is connected directly to the triac trigger terminal 28, but if desired it may also be connected to the trigger terminal 28 through the voltage threshold device 34 as by connecting the illustrated lower end of the resistor 36 to the left hand side, rather than the right hand side, of the device 34.

Figure 6:
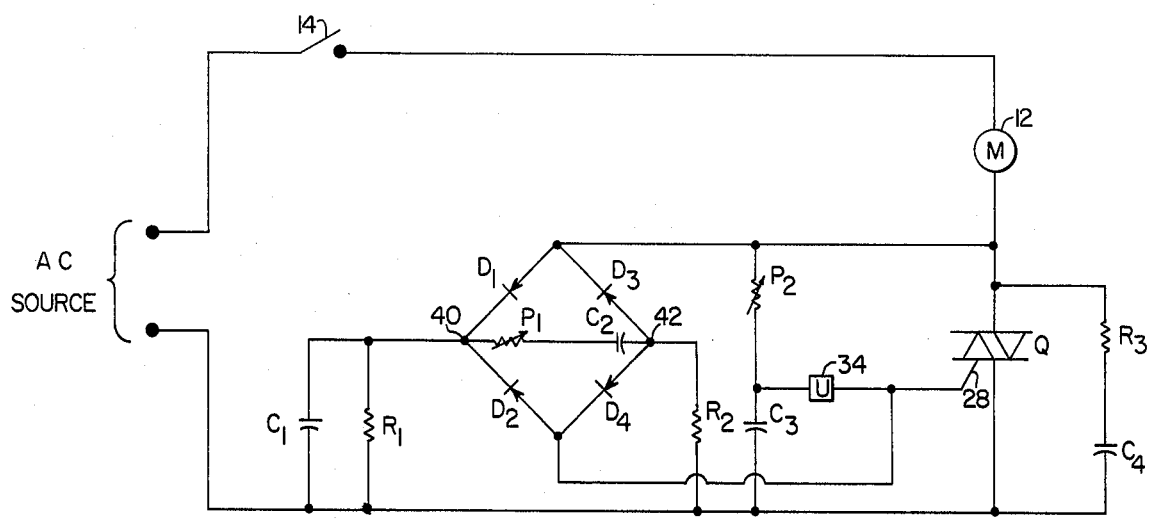

In the control of FIG. 5 the function of providing a time delay for establishing the starting period is provided by the time delay device 16 which is essentially separate from the starting trigger circuit and which may be provided by any of a number of well known time delay circuits. FIG. 6, on the other hand, shows a circuit wherein the motor control also includes a triac Q, a running trigger circuit and a starting trigger circuit, but wherein the time delay function is incorporated with the starting trigger circuit. Referring to FIG. 6, the running trigger circuit again comprises a resistor, in the form of a potentiometer $P_2$, in series with a capacitor $C_3$ connected across the main terminals of the triac Q and connected to the trigger terminal 28 through a voltage threshold device 34.

The starting trigger circuit of FIG. 6 includes an RC series timing circuit comprising a potentiometer $P_1$ and a capacitor $C_2$. This RC timing circuit is connected between the triggering terminal 28 and the upper main terminal of the triac Q through a diode bridge, consisting of the diodes $D_1$, $D_2$, $D_3$ and $D_4$, which restrains whatever current flows through the RC timing circuit to flow in one direction through the timing circuit.

The operation of the starting trigger circuit of FIG. 6 is as follows. Upon the closing of the main switch 14, the capacitor $C_2$ will normally be discharged. Then during each half cycle of positive voltage current will flow through the motor 12, through the diode $D_1$, through the potentiometer $P_1$ and capacitor $C_2$, and through the diode $D_4$ to the trigger terminal 28 to turn on the triac Q for that half cycle. During each negative half cycle of the A.C. source, current will flow out of the gate 28 through the diode $D_2$, through the potentiometer $P_1$ and capacitor $C_2$ and through $D_3$ to the motor 12, and the current flowing through the trigger terminal 28 will turn on the triac Q for that half cycle.

Thus, during the starting period the triac Q is turned on early in each half cycle of the A.C. source. As soon as that triac is turned on charging of the capacitor $C_2$ stops for that half cycle, but a slight incremental charge is added to the capacitor during each half cycle so that as the timing period progresses triggering current will flow through the trigger terminal 28 at gradually later times in successive half cycles until eventually the trigger signal provided by the starting trigger circuit will coincide with the trigger signal provided by the running trigger circuit. The time required for the capacitor $C_2$ to incrementally reach the state of charge necessary to produce this coincidence of trigger signals determines the length of the starting period and thereafter the timing of firing of the triac Q is dictated by triggering signals from the running trigger circuit.

The circuit of FIG. 6 also includes a discharge circuit for discharging the timing capacitor $C_2$ upon the opening of the main switch 14. This discharge circuit may simply comprise a large resistance connected in parallel with the potentiometer $P_1$ and capacitor $C_2$, but preferably and as shown, consists of two resistors $R_1$ and $R_2$, connected respectively between the nodes 40 and 42 of the diode bridge and the lower main terminal of the triac Q, and a capacitor $C_1$ in parallel with the resistor $R_1$. The values of the resistors $R_1$ and $R_2$ and of the capacitor $C_1$ are chosen to provide a rapid discharge of the capacitor $C_2$ upon the loss of supply voltage to the motor such as may occur not only by the opening of the switch 14 but as by momentary loss of power from the source or momentary opening of thermal overload switches in the motor 12. During a normal run of the starting period, the capacitor $C_1$ functions to maintain the charge on the capacitor $C_2$ during the times the triac Q is turned on. But, upon the loss of power to the motor, the capacitor $C_1$ quickly discharges through the resistor $R_1$ and then allows the capacitor $C_2$ to discharge with the entire discharge process occurring within a short time. Therefore, if power to the motor is interrupted for more than a short time, when it is reestablished it will be supplied to the motor at the higher average value provided by the starting circuit.

In the circuit of FIG. 6 the potentiometer $P_1$ may be varied to vary the length of the starting period and the potentiometer $P_2$ may be varied to vary the value of the average voltage supplied to the motor during the running phase. These potentiometers may, of course, be replaced by fixed resistors in cases where there is no need or desire to allow such adjustments.

As mentioned, various forms of triggered bilateral switching means may be used to control the flow of current through the motor 12. As an example, where the power requirements of the motor 12 are relatively high the triac Q of FIGS. 2 to 6 may be replaced by a bilateral switch means such as shown at 44 in FIG. 7. This switching means includes a triac Q, two SCRs and associated resistors and diodes as shown. In this circuit, the triac does not directly control the energization of the motor but instead controls the SCRs. $R_4$ and $R_6$ are conventional cathode gate resistors for the respective SCRs, but these resistors may not be required in all cases and sometimes may be omitted.

Figure 7:
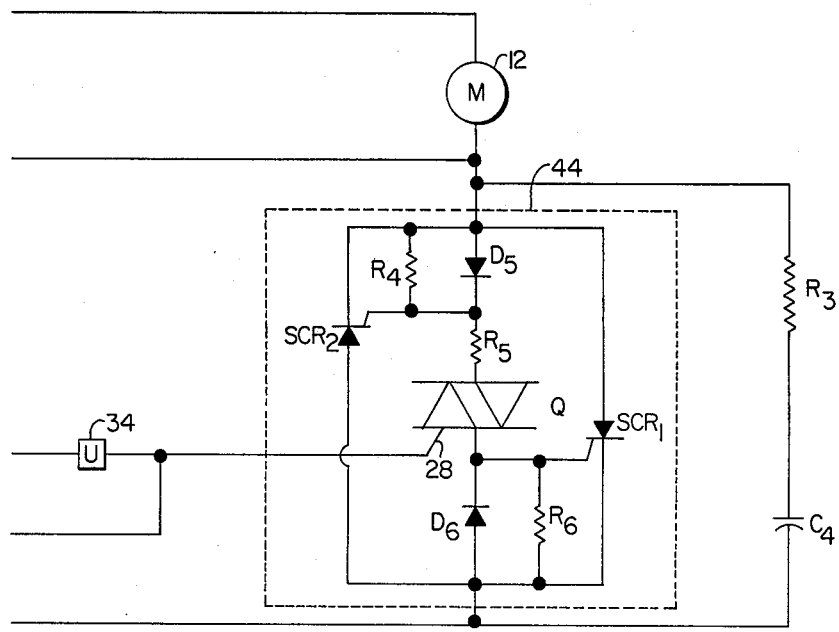
FIG. 7 is a view showing fragmentarily a control similar to that of FIG. 6 but in which a different bilateral switch means is substituted for that of FIG. 6.

As to the operation of the FIG. 7 circuit, during a half cycle of positive voltage the triac Q is turned on by a trigger signal. Current will then flow from the motor, through the diode $D_5$, the resistor $R_5$, the triac Q and then from the gate terminal to the cathode terminal of $SCR_1$, thereby turning on $SCR_1$. The voltage drop across $SCR_1$ thus falls to a low value and turns off the control circuit and applies the full source voltage to the motor during the remainder of that half cycle.

During a negative voltage half cycle the triac Q is turned on by a trigger signal and then current flows from the bottom supply line through the diode $D_6$, through the triac Q, through the resistor $R_5$ and between the gate and cathode terminals of $SCR_2$ to turn it on. When this happens the voltage across $SCR_2$ drops to a low value turning off the remainder of the control circuit and applying the full voltage of the source to the motor for the remainder of the half cycle.

Figure 8:
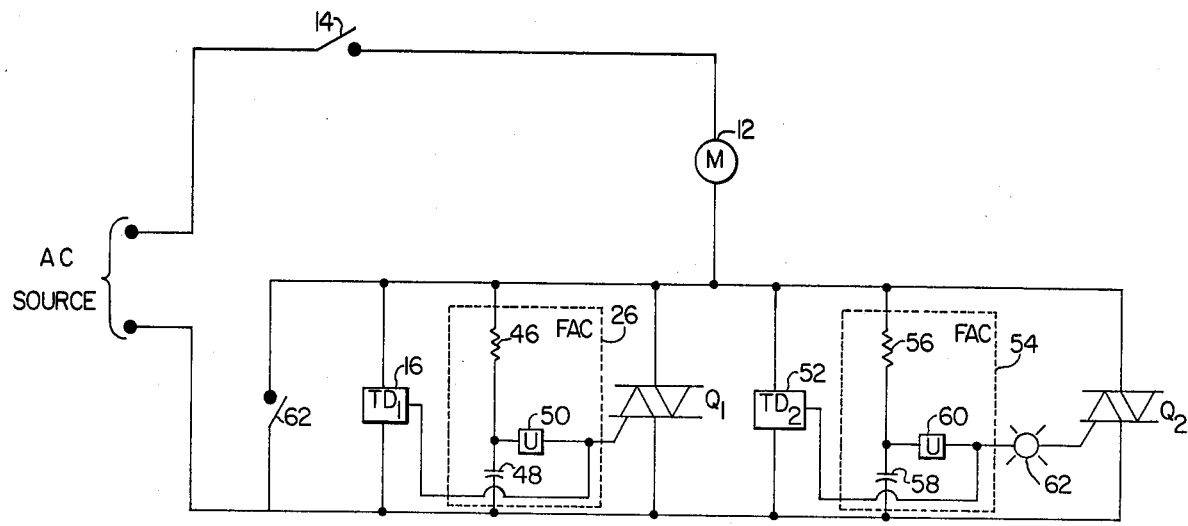
FIGS. 8 to 12 are schematic diagrams illustrating controls comprising still other embodiments of the invention.

Sometimes, such as with motors for driving sump pumps or freezers, it may be desirable to provide the motor controller with a secondary or redundant control circuit to keep the motor operating in the event the primary control circuit fails. Such an arrangement is shown in FIG. 8 wherein the primary control circuit is similar to that of FIG. 4 and consists of a triac Q, associated with a time delay device 16 and a firing angle control circuit 26 including a resistor 46, capacitor 48 and voltage threshold device 50. The secondary control circuit includes a triac $Q_2$, an associated time delay device 52 and a firing angle control circuit 54, the firing angle control circuit including a resistor 56, capacitor 58 and voltage threshold device 60. An indicating device 62, such as a light emitting diode, is connected in the trigger terminal circuit for the capacitor $Q_2$ to provide an indication when current flow occurs through that terminal. The time delay circuits 16 and 52 may be generally similar to one another and to the time delay circuit of FIG. 6 except that the components of the circuit 52 may be chosen to provide a slightly longer delay period than the delay period provided by the delay circuit 16. Also, the components of the firing angle control circuit 26 are designed to provide slightly earlier occurring running trigger signals than are the components of the secondary firing angle control circuit 54. Therefore, during normal operation of all the circuits the starting trigger signals provided by the time delay circuit 16 control starting of the motor 12 through the triac $Q_1$ and the running trigger signals provided by the circuit 26 control the subsequent running of the motor 12 through the triac $Q_1$. However, should the device 16 fail starting of the motor will be overtaken by the device 52 operating in combination with the triac $Q_2$; and should the circuit 26 fail running of the motor 12 will be overtaken by the circuit 54 in cooperation with the triac $Q_2$. Should the triac $Q_1$ fail open or apply a lesser value of voltage to the motor, the triac $Q_2$ and its associated circuits 52 and 54 will take over both starting and running control of the motor. Whenever the triac $Q_2$ does undertake some or all of the motor control the indicator 62 will light to indicate the presence of some fault in the system. The circuit of FIG. 8 also includes a manual switch 62 which may be closed to apply full source voltage to the motor at all times, bypassing the motor control.

Figure 9:
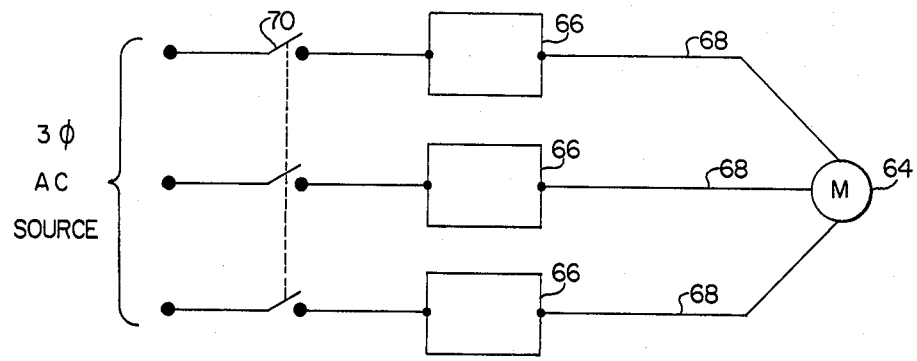
Figure 10:
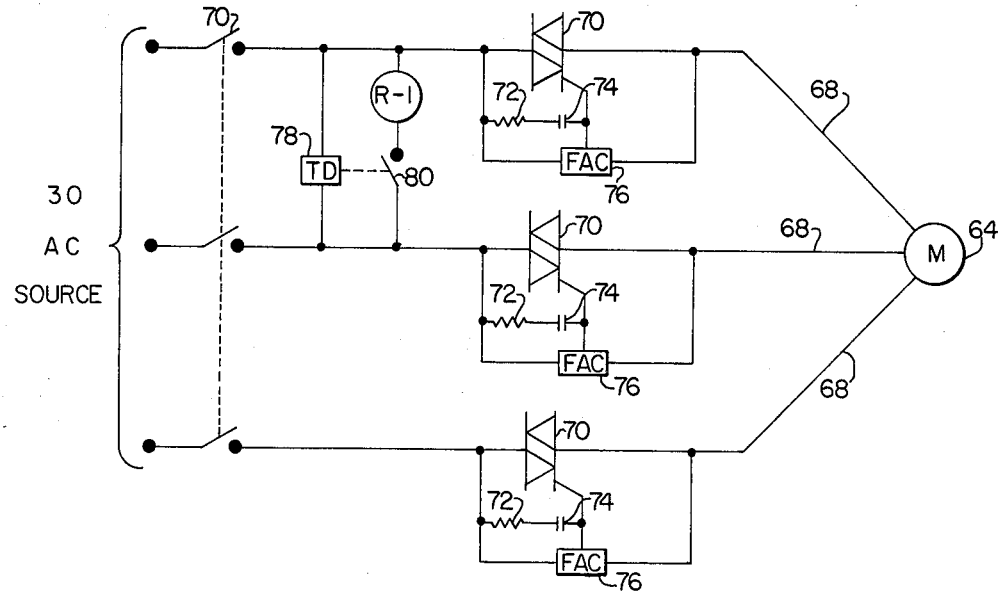

In addition to control of single phase motors, the control of this invention may also be applied to multiphase motors. By way of example, FIGS. 9 and 10 show the control of the invention applied to three phase motors. In FIG. 9 the control for the illustrated three phase motor 64 is provided by three identical control units 66, 66 each connected in each of the three motor lines 68, 68 in series with the main switch 70. Each of the units 66 is or may be similar to any one of the units of FIGS. 1 to 8. The FIG. 4 and FIG. 6 forms of control are particularly advantageous in cases where the motor 64 includes thermal overload protection or other means for opening the circuit between the control and the motor.

In cases where the motor is not provided with thermal protective means or where there are no other means for opening the circuit between the control and the motor, a simplified control may be used as shown in FIG. 10. In this case each motor line 68 includes a triac 70, or other triggered bilateral switch means (or transformer or other voltage controlling means), a starting trigger circuit consisting of a resistor 72 and a set of contacts 74, and a firing angle control circuit 76 providing control signals to the trigger terminal of the associated triac 70 (or transformer or other voltage controlling means) at a fixed time in each half cycle of power. Across two of the motor lines 68, 68 is a time delay device 78 which, through a switch 80, controls a relay coil R-1 for operating the contacts 74, 74, 74. When the main switch 70 is closed the time delay 78 closes the switch 80 to energize the relay coil R-1 and to thereby simultaneously close the contacts 74, 74, 74, thereby causing all three triacs 70, 70, 70 to be fired early in each half cycle. At the end of the time delay period provided by the device 78 the switch 80 is opened to deenergize the relay R-1 and to open the contacts 74, 74, 74, thereby passing control of the triacs 70, 70, 70 to the firing angle control circuits 76, 76, 76 which trigger the triacs at later times in each half cycle to feed lower average voltages to the motor 64. Contacts 74, 74, 74 with their associated resistors 72, 72, 72 could also be placed in the firing angle control circuits 76, 76, 76 (ahead of the voltage threshold devices of such circuits) to accomplish the early firing of triacs 70, 70, 70.

Figure 11:
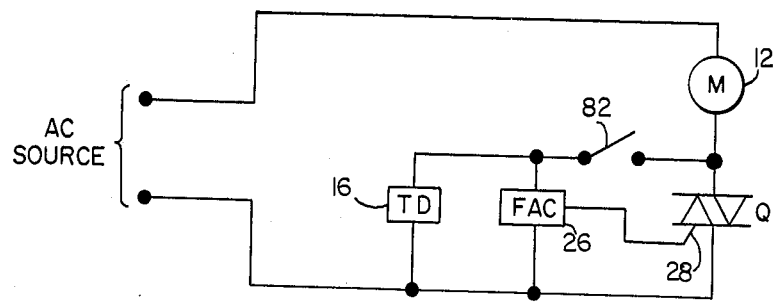

In the foregoing embodiments of the invention, the switching means, which upon being switched from an open to a closed (that is from an OFF to an ON) condition starts the associated motor in operation, is shown to be a main switch in series with the A.C. source and the motor. This location of the switching means is not, however, the only possible one. By way of example, FIG. 11 shows a control circuit generally similar to that of FIG. 4, including a triac Q connected in series with a motor 12, and with a time delay circuit 16 and a firing angle control circuit 26 connected in parallel with one another across the terminals of the triac. In this case, however, no switch is in series with the motor 12 and the switching means instead comprises a switch 82 in the control circuit. The time delay circuit 16 and firing angle control circuit 26 operate to provide trigger signals to the trigger terminal 28 of the triac Q. When the switch 82 is open (or OFF) it de-energizes the time delay circuit 16 and firing angle control circuit 26 and thereby conditions them to not supply trigger signals to the triac Q so that the motor 12 remains unenergized. When the switch 82 is closed (or switched ON), it energizes the time delay circuit 16 and firing angle control circuit 26 to thereby cause them to supply trigger signals to the triac Q, and the motor is accordingly energized in the manner previously described in connection with the circuit of FIG. 4.

In FIG. 11 the switch 82 is shown in the line connecting the time delay circuit 16 and the firing angle control circuit 26 to the node between the motor 12 and the triac Q, but again this location of the switch 82 within the control circuit is not the only possible one and it could be placed at other locations as, for example, in the line supplying trigger signals to the trigger terminal 28.

Figure 12:
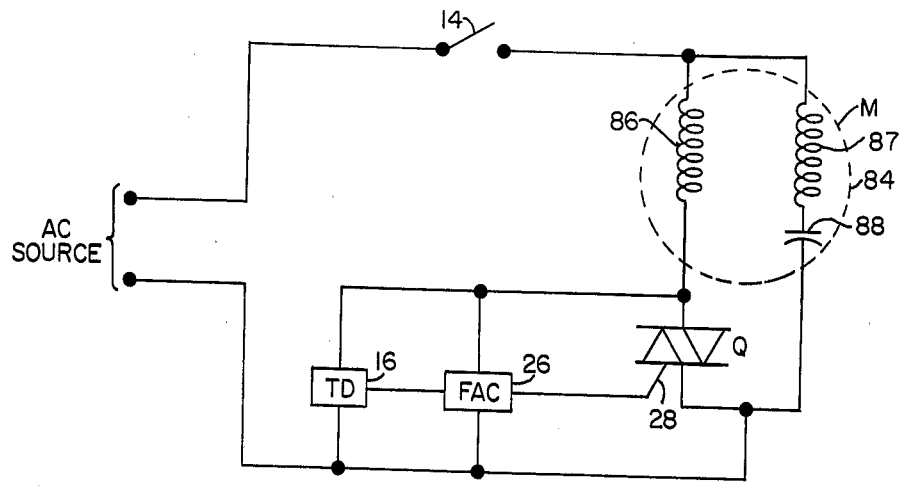

In the foregoing embodiments of the invention relating to single phase motors, as in FIGS. 1 to 8 and 11, it has been assumed that the motor 12 includes either one winding or two or more windings in parallel with one another, and the control is connected with the motor so as to be directly effective on all windings. This, however, is not necessarily always the case and where the motor has two or more parallel windings the control may be connected with the motor so as to have a direct voltage control effect on only one of those windings. As an example of this, FIG. 12 shows a control generally similar to that of FIG. 4 associated with a motor 84 which is a permanent split-capacitor induction motor having a run winding 86 and, parallel thereto, an auxiliary or start winding 87 in series with a capacitor 88. Here the control circuit is arranged so as to be directly effective on the run winding 86, this being accomplished by placing the triac Q in series with only the run winding 86. The time delay circuit 16 and the firing angle control circuit 26 are both illustrated to be connected across the triac Q, but this is not essential and one or both of these circuits could be connected instead across the series combination of the triac Q and the run winding 86.

Also, in the foregoing description and the accompanying illustrations the control circuit of the invention has been described and shown, in each embodiment, in use with a single motor. However, in some situations a number of motors may be connected in parallel with one another and be connected to the AC power source through a single control made in accordance with the invention thereby minimizing the cost of the control per motor.

I claim:

1. A motor control in combination with a motor and a source of substantially constant frequency and substantially constant voltage A.C. power, said motor control comprising terminals connecting it in circuit with said motor and with said source of A.C. power, a main switching means switchable between ON and OFF conditions, and control means responsive to the switching of said main switching means from its OFF to its ON condition and operable while said A.C. source remains at its substantially constant frequency and its substantially constant voltage for first feeding power from said source to said motor at a high average voltage during a starting period of some duration and for automatically thereafter feeding power from said source to said motor at a lower average voltage of fixed value which is maintained for so long as said main switching means remains in its ON condition, said high average voltage at least at the very beginning of said starting period being equal to the average value of the voltage of said source.

2. A motor control as defined in claim 1 further characterized by an open loop circuit in said control means for establishing the value of said lower average voltage.

3. A motor control as defined in claim 2 further characterized by said open loop circuit in said control means for establishing the value of said lower average voltage including an RC series circuit in combination with a voltage threshold device.

4. A motor control as defined in claim 2 further characterized by means in said control means establishing the duration of said starting period and which starting period establishing means establishes a starting period of substantially predetermined duration while said A.C. source remains at its substantially fixed frequency and its substantially fixed voltage.

5. A motor control as defined in claim 4 further characterized by said means establishing the duration of said starting period including an RC series timing circuit electrically connected with the other elements of said control system so that immediately upon the switching of said main switching means from its OFF to its ON condition the charge on the capacitance thereof is incrementally increased during each half cycle of such A.C. source, and means responsive to the charge on said capacitance of said RC timing circuit reaching a given value for thereafter feeding power from said source to said motor at said lower average voltage of fixed value.

6. A motor control as defined in claim 1 further characterized by said control means being contained entirely within a unit connected in series with said motor.

7. A motor control as defined in claim 1 in combination with a permanent split-capacitor induction motor having a run winding and an auxiliary winding connected in parallel with one another, said control means being contained entirely within a unit connected in series with said run winding.

8. A motor control as defined in claim 1 in combination with a multiple phase motor having a multiple number of supply lines for connection to a source of A.C. power such as aforesaid, said control means being contained entirely within a multiple number of identical units each connected in a respective one of said supply lines in series with said motor.

9. A motor control as defined in claim 1 further characterized by said control means including a variable turns ratio transformer connected between said A.C. source and said motor, said switching means being a main switch in series with said A.C. source and said motor, and means responsive to the closing of said main switch for setting said transformer to cause it to feed power from said source to said motor at said high average voltage during said starting period and for automatically thereafter setting said transformer to cause it to feed said power from said source to said motor at said lower average voltage.

10. A motor control as defined in claim 1 further characterized by said control means including a triggered bilateral switch means connected in series with such motor, and means responsive to the switching of said main switching means from its OFF to its ON condition for triggering said bilateral switch means early in each half cycle of such A.C. source to cause it to feed power from such A.C. source to such motor winding at said high average voltage during said starting period and for automatically thereafter triggering said bilateral switch means later in each of said half cycles of such A.C. source to cause it to feed power from said A.C. source to said motor winding at said lower average voltage, said means responsive to the switching of said main switching means operating during at least the very beginning of said starting period to trigger said bilateral switch means at the very beginning of each half cycle of such A.C. source so that the power fed to said motor winding is of an average voltage equal to the average value of the voltage of said source.

11. A motor control as defined in claim 10 further characterized by said triggered bilateral switch means being a triac.

12. A motor control as defined in claim 10 further characterized by said triggered bilateral switch means including two antiparallel connected SCRs.

13. A motor control as defined in claim 10 further characterized by said control means including an RC series circuit in combination with a voltage threshold device for triggering said bilateral switch means at a substantially fixed point in each half cycle of said A.C. source after said starting period to establish said lower average voltage at which power from said A.C. source is fed to said motor.

14. A motor control as defined in claim 13 further characterized by said bilateral switch means having a trigger terminal to which said voltage threshold device is connected and to which said voltage threshold device supplies trigger signals, and a starting circuit connected to said trigger terminal in parallel with said voltage threshold device for supplying to said trigger terminal during said starting period starting trigger signals which occur earlier in each half cycle of said A.C. power than the trigger signals supplied by said voltage threshold device.

15. A motor control as defined in claim 14 further characterized by said starting circuit including means supplying said starting trigger signals to said trigger terminal during the lapse of said starting period which starting trigger signals initially occur very early in each half cycle of said A.C. power and occur at gradually later times in each half cycle until reaching simultaneity with the trigger signals supplied by said voltage threshold device.

16. A motor control as defined in claim 1 further characterized by said control means including a triggered bilateral switch means connected in series with said motor, and means responsive to the switching of said main switching means from its OFF to its ON condition for initially triggering said bilateral switch means at an early time in each half cycle of such A.C. source, for subsequently triggering said bilateral switch at times which occur gradually later in each such half cycle until reaching a given time in each half cycle, and for thereafter triggering said bilateral switch means at said given time in each subsequent half cycle for so long as said main switching means remains in its ON condition.

17. A motor control system, said system comprising a source of A.C. power of substantially constant frequency and substantially constant voltage, an A.C. motor having at least one winding, a main switch switchable between ON and OFF conditions, and a control means connected with said motor winding, with said A.C. source and with said main switch, said control means being responsive to the switching of said main switch from its OFF to its ON condition to first feed power from said source to said motor winding at a high average voltage during a starting period of some duration and to automatically thereafter feed power from said source to said motor winding at a lower average voltage which lower average voltage is substantially fixed and is maintained for so long as said main switch remains in its ON condition, said high average voltage at least at the very beginning of said starting period being equal to the average value of the voltage of said source.

18. A motor control as defined in claim 1 further characterized by said control means including a triggered bilateral switch means having two main terminals and a trigger terminal and which bilateral switch means is electrically connected in series with said motor through said two main bilateral switch terminals, a starting trigger circuit connected across said main terminals of said bilateral switch means and operable to supply said trigger terminal with trigger signals during said starting period which occur early during each half cycle of said A.C. source, and a running trigger circuit connected across said two main bilateral switch terminals and operable to supply said trigger terminal with trigger signals which occur at a later substantially fixed time during each half cycle of said A.C. source.

19. A motor control as defined in claim 18 further characterized by said running trigger circuit being a resistor and capacitor connected in series across said two main bilateral switch terminals and a voltage threshold device connected between the junction of said resistor and capacitor and said trigger terminal.

20. A motor control as defined in claim 18 or 19 further characterized by said starting trigger circuit including an RC series timing circuit, and diode means connecting said timing circuit between one of said two main bilateral switch terminals and said trigger terminal so that current flowing between said one main terminal and said trigger terminal and through said timing circuit is constrained to flow unidirectionally through said timing circuit, and a discharge circuit connected with said timing circuit for discharging said circuit upon the switching of said main switching means from its ON to its OFF condition, whereby when said main switching means is switched from its OFF to its ON condition the capacitance of said timing circuit is incrementally charged during the following half cycles of said A.C. source with charging current which passes through said trigger terminal and triggers said bilateral switch means early in each half cycle until the charge on said capacitance reaches such value that the trigger signal produced by said starting trigger circuit occurs simultaneously with the trigger signal produced by said running trigger circuit.

21. A motor control as defined in claim 20 further characterized by said diode means being a diode bridge having one node connected to said one main bilateral switch terminal and an opposite node connected to said trigger terminal, and said RC series timing comprises a resistor and capacitor connected in series with one another between the other two nodes of said diode bridge, said discharge circuit comprising a resistance circuit connected between said other two nodes of said diode bridge.

22. A motor control as defined in claim 21 further characterized by said discharge circuit comprising two resistors each connected between a respective one of said other two nodes of said diode bridge and the other of said two main terminals of said bilateral switch means.

23. A motor control as defined in claim 22 further characterized by a capacitor connected between one of said other nodes of said diode bridge and said other of said main terminals of said bilateral switch means.

24. A motor control as defined in claim 18 further characterized by said running trigger circuit being connected directly to said two main terminals of said bilateral switch means so that said bilateral switch means is in parallel with said running trigger circuit to the exclusion of said motor.

25. A motor control as defined in claim 18 further characterized by said running trigger circuit being connected across said bilateral switch means in such manner as to include said motor and said bilateral switch means in series with one another and in parallel with said running trigger circuit.

26. A motor control as defined in claim 24 further characterized by said starting trigger circuit being connected directly to said two main terminals of said bilateral switch means so that said bilateral switch means is in parallel with said starting trigger circuit to the exclusion of said motor.

27. A motor control as defined in claim 24 or 25 further characterized by said starting trigger circuit being connected across said bilateral switch means in such a manner as to include said motor and said bilateral switch means in series with one another and in parallel with said starting trigger circuit.

28. A motor control as defined in claim 18 further characterized by said starting trigger circuit including a resistance and a switch device connected in series with one another between one of said main terminals of said bilateral switch means and said trigger terminal, and means for closing said switch device during said starting period and for opening said switch device at the end of said starting period.

29. A motor control as defined in claim 1 in combination with a multiple phase motor having a multiple number of supply lines, there being one of said voltage control means in each of said supply lines, each of said voltage control means having associated with it a time delay circuit causing said voltage control means to supply a high average voltage to said motor during a starting period of some duration and to thereafter cause said voltage control means to supply a lower average voltage to said motor.

30. A motor control as defined in claim 18 in combination with a multiple phase motor having a multiple number of supply lines, there being one of said bilateral switch means in each of said supply lines, each of said bilateral switch means having associated with it a running trigger circuit connected across its main terminals and operable to supply its trigger terminal with running trigger signals which occur at a substantially fixed time in each half cycle of such A.C. source, and each of said bilateral switch means having associated with it a starting trigger circuit connected across its main terminals and operable to supply its trigger terminal with starting trigger signals during said starting period which occur earlier in each half cycle of said A.C. source than said substantially fixed time of said running trigger signals.

31. A motor control as defined in claim 30 further characterized by said starting trigger circuit for each of said bilateral switch means including a resistor and a switch device connected in series with one another between one of the main terminals of said bilateral switch means and its trigger terminal, and a single time delay circuit connected between two of said supply lines operable in response to the switching of said switching means from its OFF to its ON condition to simultaneously close all of said switch devices and thereafter to simultaneously open all of said switch devices at the end of said starting period.

32. A motor control as defined in claim 18 further characterized by a second bilateral switch means connected in series with said motor in parallel with said first bilateral switch means, a running trigger circuit for said second bilateral switch means, said running trigger circuit of said second bilateral switch means being operable to supply trigger signals to said second bilateral switch means at a time in each half cycle of said A.C. source which is slightly later than the occurrence time of the trigger signals provided by said running trigger circuit associated with said first bilateral switch means.

33. A motor control as defined in claim 32 further characterized by an indicating device connected with the trigger terminal of said second bilateral switch means to indicate the occurrence of current flow through said latter trigger terminal.

34. A motor control as defined in claim 18 further characterized by a series RC circuit connected across said bilateral switch means for limiting the rate of rise of the commutating voltage produced across said bilateral switch means by the inductance of said motor.

35. A motor control as defined in claim 1 further characterized by said control means including a triggered means connected immediately between and in series with said A.C. source and said motor for controlling the flow of current from said source through said motor, and trigger means for providing trigger signals for said triggered means, said trigger means being responsive to said main switching means so as to supply trigger signals to said triggered means when said main switching means is in its ON condition and so as to not supply trigger signals to said triggered means when said main switching means is in its OFF condition.

36. A motor control as defined in claim 28 further characterized by said running trigger circuit being a resistor and capacitor connected in series across said two main bilateral switch terminals and a voltage threshold device connected between the junction of said resistor and capacitor and said trigger terminal, and said starting trigger circuit is connected to said trigger terminal through said voltage threshold device.

37. A motor control as defined in claim 1 wherein said motor is a permanent split-capacitor induction motor with a run winding and an auxiliary winding in parallel with one another, and means connecting said control means in series with said run winding to the exclusion of said auxiliary winding.

38. A motor control system comprising: an A.C. source of substantially constant frequency and substantially constant voltage, a main switching means switchable between ON and OFF conditions, a motor, a voltage control means connected in circuit with said A.C. source and said motor, and a time delay means causing said voltage control means to supply a high average voltage to said motor winding during a starting period of some duration beginning with the switching of said switching means from its OFF to its ON condition and to thereafter cause said voltage control means to supply a lower average voltage of substantially fixed value to said motor for so long as said switching means remains in its ON condition, said high average voltage at least at the very beginning of said starting period being equal to the average value of the voltage of said source.

39. A motor control as defined in claim 25 further characterized by said starting trigger circuit being connected directly to said two main terminals of said bilateral switch means so that said bilateral switch means is in parallel with said starting trigger circuit to the exclusion of said motor.

40. A motor control as defined in claim 35 further characterized by said trigger means including means responsive to the switching of said main switching means from its OFF to its ON condition for triggering said triggered means early in each half cycle of said source to cause it to feed power from said A.C. source to said motor winding at said high average voltage during said starting period and for automatically thereafter triggering said triggered means later in each half cycle of said A.C. source to said motor at said lower average voltage.

41. A motor control as defined in claim 1 further characterized by said control means including means for causing said high average voltage of said starting period to remain at a substantially fixed value during said starting period and for causing the voltage fed to said motor to switch from said high average voltage of fixed value to said lower average voltage of fixed value at the end of said starting period.

42. A motor control as defined in claim 1 further characterized by said control means including means for causing said high average voltage of said starting period to start at a high value at the beginning of said starting period and to gradually diminish during said starting period so as to reach said lower average voltage of fixed value at the end of said starting period.

43. A motor control system as defined in claim 17 further characterized by said main switch being in series with said A.C. source and said motor winding.

* * * * *